United States Patent
Hough et al.

(10) Patent No.: US 11,236,677 B2
(45) Date of Patent: Feb. 1, 2022

(54) DIFFUSER CASE SUPPORT STRUCTURE

(71) Applicant: UNITED TECHNOLOGIES CORPORATION, Farmington, CT (US)

(72) Inventors: Matthew Andrew Hough, West Simsbury, CT (US); John S. Tu, Agawam, MA (US); Stephen C. Harmon, East Hampton, CT (US); Paul F. Croteau, Columbia, CT (US); Russell B. Hanson, Jupiter, FL (US); Joshua C. Rathgeb, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 153 days.

(21) Appl. No.: 16/413,347

(22) Filed: May 15, 2019

(65) Prior Publication Data
US 2020/0362762 A1 Nov. 19, 2020

(51) Int. Cl.
*F02C 7/28* (2006.01)
*F02C 7/32* (2006.01)

(52) U.S. Cl.
CPC .................. *F02C 7/28* (2013.01); *F02C 7/32* (2013.01); *F05D 2220/32* (2013.01); *F05D 2240/55* (2013.01)

(58) Field of Classification Search
CPC .......... F02C 7/28; F02C 7/32; F05D 2220/32; F05D 2240/55; F04D 29/54; F04D 29/545; F01D 9/02
See application file for complete search history.

(56) References Cited

U.S. PATENT DOCUMENTS 2,932,442 A 4/1960 Hart et al.
2006/0288707 A1* 12/2006 Weaver .................... F23R 3/60
60/796

(Continued)

FOREIGN PATENT DOCUMENTS

EP 2354459 8/2011
EP 2784267 10/2014

(Continued)

OTHER PUBLICATIONS

European Patent Office, European Search Report dated Sep. 10, 2020 in Application No. 20174950.4.

*Primary Examiner* — Christopher Verdier
*Assistant Examiner* — Eric A Lange
(74) *Attorney, Agent, or Firm* — Snell & Wilmer L.L.P.

(57) ABSTRACT

A diffuser case support structure for a gas turbine engine includes a fairing disposed circumferentially about a longitudinal axis. The fairing defines a plurality of passages circumferentially spaced apart and forming at least a portion of a fluid path between a compressor and a combustor of the gas turbine engine. A diffuser frame includes a plurality of struts. Each of the plurality of struts is disposed between a pair of adjacent passages of the plurality of passages. The diffuser frame is configured to couple an inner diffuser case to an outer diffuser case. A sliding joint is formed between the fairing and the diffuser frame, the sliding joint comprising a fastener extending generally axially through an aperture disposed in the fairing.

20 Claims, 6 Drawing Sheets

(56) References Cited

U.S. PATENT DOCUMENTS

| | | | | |
|---|---|---|---|---|
| 2013/0223982 A1* | 8/2013 | Durocher | ............... | F16B 5/04 |
| | | | | 415/12 |
| 2014/0290272 A1* | 10/2014 | Mulcaire | ............... | F04D 29/321 |
| | | | | 60/806 |
| 2014/0373556 A1* | 12/2014 | Aronsson | ............... | F02C 7/20 |
| | | | | 60/796 |
| 2016/0084502 A1* | 3/2016 | Cunha | ............... | F23R 3/04 |
| | | | | 60/772 |
| 2016/0090914 A1 | 3/2016 | Lyons | | |

FOREIGN PATENT DOCUMENTS

| | | |
|---|---|---|
| FR | 2887924 | 1/2007 |
| WO | 2014197037 | 11/2014 |

\* cited by examiner

DIFFUSER CASE SUPPORT STRUCTURE

U.S. GOVERNMENT RIGHTS

This invention was made with Government support awarded by the United States. The Government has certain rights in this invention.

FIELD

The present disclosure relates to gas turbine engines, and, more particularly, to diffuser case arrangements.

BACKGROUND

During operation of a gas turbine engine, heated core gases flow from a compressor section to a combustor section where they are mixed with fuel and ignited. Elevated core gas temperatures may induce large thermal gradients on engine components in the core flowpath.

For example, during a transient acceleration from idle to takeoff power, a support structure for an inner diffuser case, forming part of the core flowpath, may rapidly reach takeoff metal temperatures. The resulting thermal gradient may create stress concentrations at intersections of comparatively hotter and colder portions of the diffuser cases and associated support structure. The thermal stress concentrations may be exacerbated by the need for the inner diffuser case structure to be stiff enough to support a shaft bearing of the gas turbine engine.

SUMMARY

A diffuser case support structure for a gas turbine engine is disclosed, comprising a fairing disposed circumferentially about a longitudinal axis, the fairing defining a plurality of passages circumferentially spaced apart and forming at least a portion of a fluid path between a compressor and a combustor of the gas turbine engine, a diffuser frame comprising a plurality of struts, each of the plurality of struts disposed between a pair of adjacent passages of the plurality of passages, and a sliding joint forming an interface between the fairing and the diffuser frame, the sliding joint comprising a fastener extending generally axially through an aperture disposed in the fairing, wherein the diffuser frame is configured to couple an inner diffuser case to an outer diffuser case.

In various embodiments, a space between each pair of adjacent passages of the plurality of passages defines a recessed portion of the fairing extending axially from an axial end of the fairing through a portion of the fairing.

In various embodiments, the diffuser frame and the inner diffuser case form a monolithic component.

In various embodiments, the diffuser case support structure further comprises a first seal configured to maintain a seal between the outer diffuser case and the fairing.

In various embodiments, the diffuser case support structure further comprises a second seal configured to maintain a seal between the fairing and the diffuser frame.

In various embodiments, the sliding joint is disposed at an aft end of the fairing.

In various embodiments, the diffuser frame is made of a first material and the fairing is made of a second material different than the first material.

In various embodiments, the diffuser case support structure further comprises a third seal configured to maintain a seal between the fairing and the diffuser frame, wherein the second seal is located radially opposite the fairing from the third seal.

In various embodiments, the sliding joint further comprises a bushing extending through the aperture, the bushing compressed between the diffuser frame and the fastener.

In various embodiments, the fairing is configured to move radially with respect to the diffuser frame via the sliding joint, in response to at least one of thermal expansion and contraction of the fairing in a radial direction.

In various embodiments, at least one strut of the plurality of struts is hollow, thereby defining a channel configured to conduct a flow of fluid between a compartment radially outside the inner diffuser case to a compartment radially inside the inner diffuser case.

In various embodiments, the fairing is a single-piece of material.

A diffuser case support structure for a gas turbine engine is disclosed, comprising a fairing disposed circumferentially about a longitudinal axis, a diffuser frame, and a sliding joint forming an interface between the fairing and the diffuser frame. The fairing defines a plurality of passages circumferentially spaced apart and forming at least a portion of a fluid path between a compressor and a combustor of the gas turbine engine, and a space between each pair of adjacent passages of the plurality of passages, the space defining a recessed portion of the fairing extending axially from an axial end of the fairing through a portion of the fairing. The diffuser frame comprises a plurality of struts, each strut of the plurality of struts disposed between a pair of adjacent passages of the plurality of passages. The sliding joint comprises a fastener extending generally axially through an aperture disposed in the fairing. The diffuser frame is configured to couple an inner diffuser case to an outer diffuser case.

In various embodiments, the diffuser frame and the inner diffuser case form a monolithic component.

In various embodiments the diffuser case support structure further comprises a diffuser frame flange extending radially inward from the outer diffuser case, wherein the diffuser frame is configured to be coupled to the diffuser frame flange via at least one of a metal joining process or a mechanical fastener.

In various embodiments the diffuser case support structure further comprises a seal flange extending radially inward from the outer diffuser case, and a first seal configured to maintain a seal between the seal flange and the fairing.

A gas turbine engine is disclosed, comprising an inner diffuser case, an outer diffuser case, and a diffuser case support structure coupling the inner diffuser case to the outer diffuser case. The diffuser case support structure comprises a fairing disposed circumferentially about a longitudinal axis, the fairing defining a plurality of passages circumferentially spaced apart and forming at least a portion of a fluid path between a compressor and a combustor of the gas turbine engine, a diffuser frame comprising a plurality of struts, each of the plurality of struts disposed between a pair of adjacent passages of the plurality of passages, and a sliding joint forming an interface between the fairing and the diffuser frame, the sliding joint comprising a fastener extending generally axially through an aperture disposed in the fairing.

In various embodiments, the diffuser frame and the inner diffuser case form a monolithic component.

In various embodiments, the diffuser frame is coupled to the outer diffuser case via at least one of a metal joining process or a mechanical fastener.

In various embodiments, the diffuser frame is made of a first material and the fairing is made of a second material different than the first material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
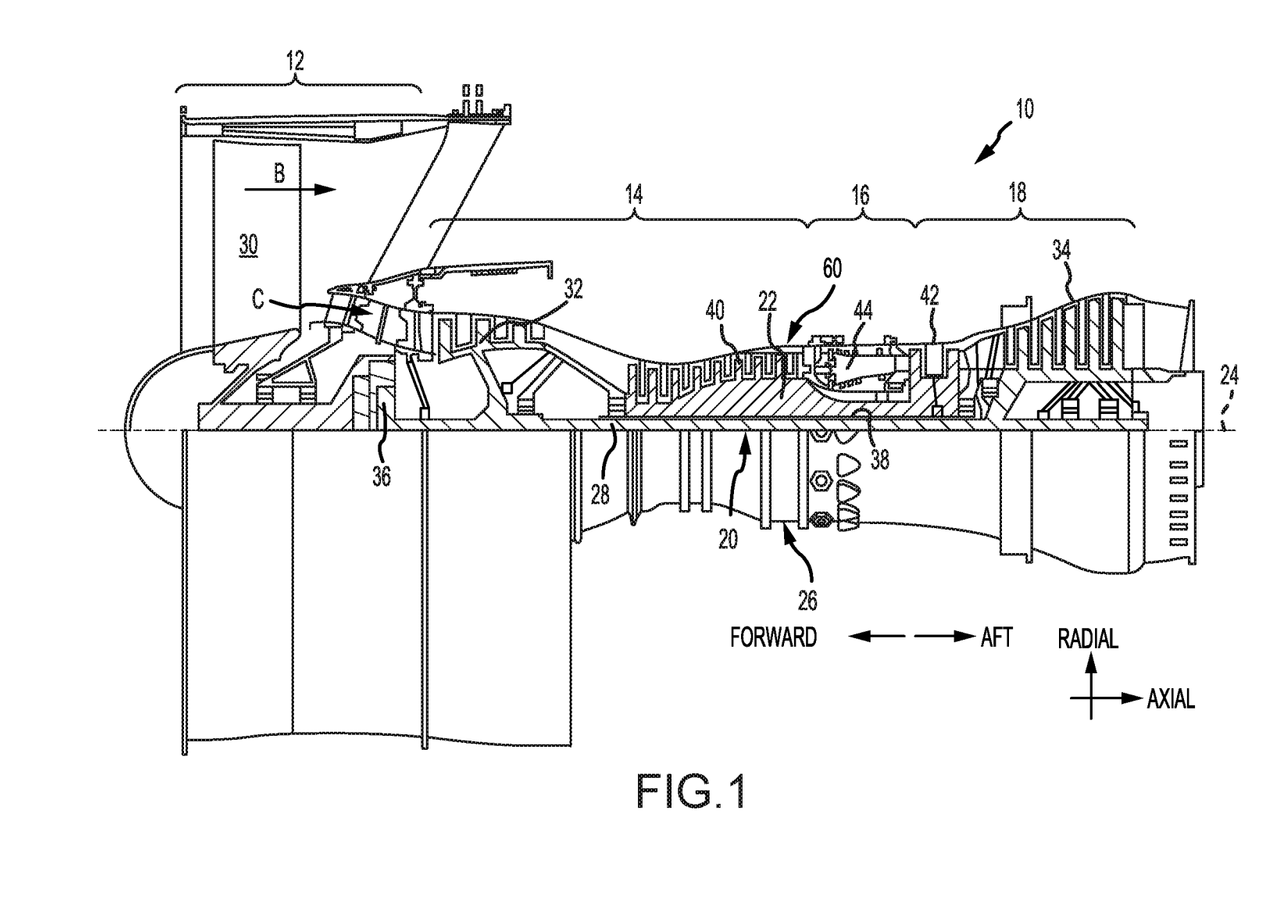
FIG. 1 illustrates a schematic cross-sectional view of a gas turbine engine.

FIG. 1 schematically illustrates a gas turbine engine 10, in accordance with various embodiments. The gas turbine engine 10 is disclosed herein as a two-spool turbofan that generally incorporates a fan section 12, a compressor section 14, a combustor section 16, and a turbine section 18. The fan section 12 drives air along a bypass flowpath B while the compressor section 14 drives air along a core flowpath C for compression and communication into the combustor section 16, then expansion through the turbine section 18. Although depicted as a turbofan gas turbine engine in the disclosed non-limiting embodiment, it should be understood that the concepts described herein are not limited to use with turbofans as the teachings may be applied to other types of turbine engines.

The gas turbine engine 10 generally includes a low-speed spool 20 and a high-speed spool 22 mounted for rotation about an engine central longitudinal axis 24 relative to an engine static structure 26. It should be understood that various bearing systems at various locations may alternatively or additionally be provided.

The low-speed spool 20 generally includes an inner shaft 28 that interconnects a fan 30, a low-pressure compressor 32 and a low-pressure turbine 34. The inner shaft 28 is connected to the fan 30 through a geared architecture 36 to drive the fan 30 at a lower speed than the low-speed spool 20. The high-speed spool 22 includes an outer shaft 38 that interconnects a high-pressure compressor 40 and high-pressure turbine 42. A combustor 44 is arranged between the high-pressure compressor 40 and high-pressure turbine 42.

The core airflow is compressed by the low-pressure compressor 32 then the high-pressure compressor 40, passed through a diffuser case assembly 60, mixed and burned with fuel in the combustor 44, and then expanded over the high-pressure turbine 42 and the low-pressure turbine 34. The turbines rotationally drive the respective low-speed spool 20 and high-speed spool 22 in response to the expansion.

Figure 2:
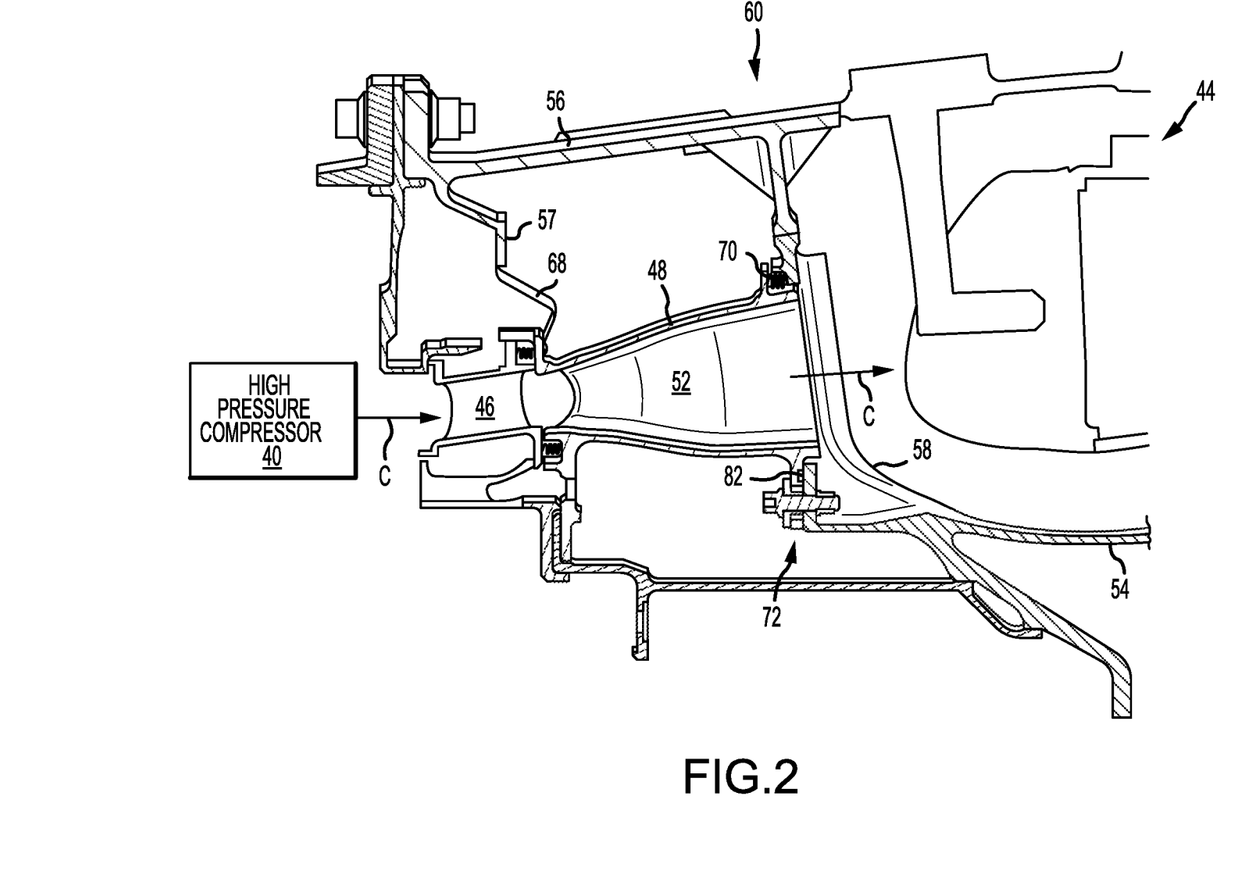
FIG. 2 illustrates a cross-sectional side view of a diffuser case arrangement of a gas turbine engine.
Figure 3:
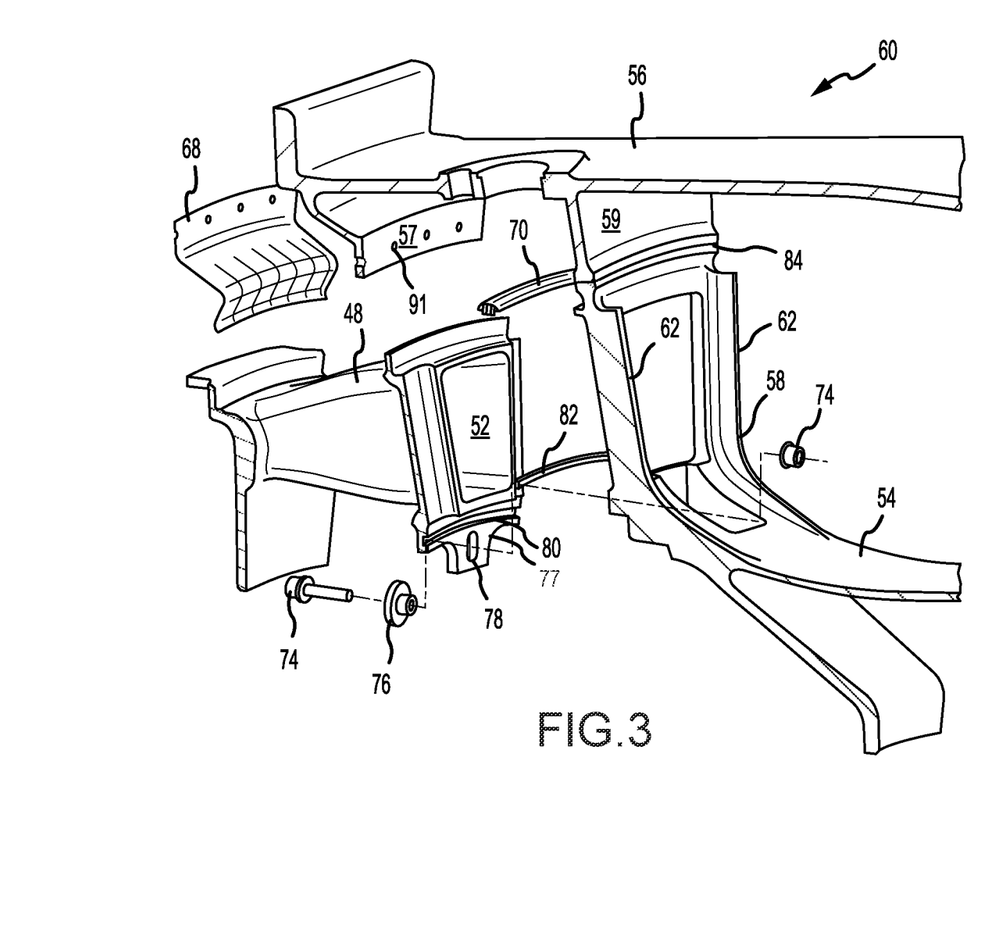
FIG. 3 illustrates an exploded view of the diffuser case arrangement of FIG. 2.
Figure 4A:
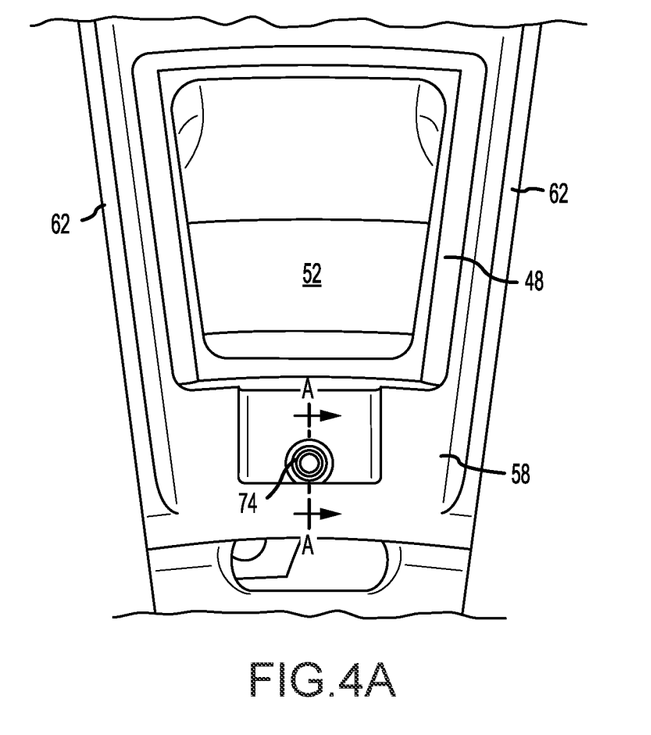
FIG. 4A illustrates an aft-looking-forward view of a portion of the diffuser case arrangement of FIG. 2.
Figure 4B:
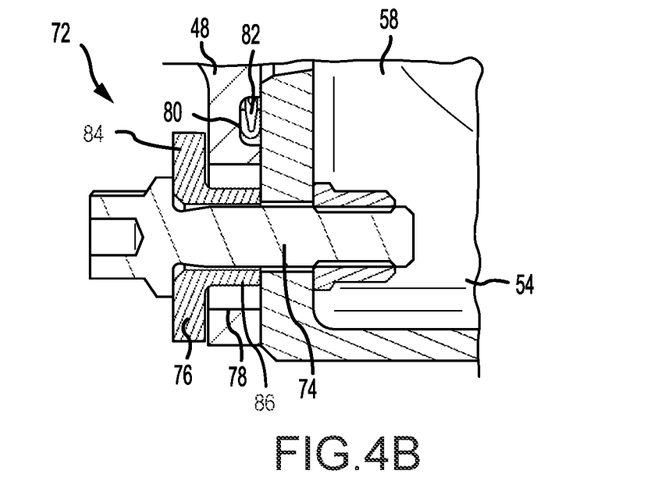
FIG. 4B illustrates a cross-sectional view of the sliding joint of FIG. 4A.
Figure 5:
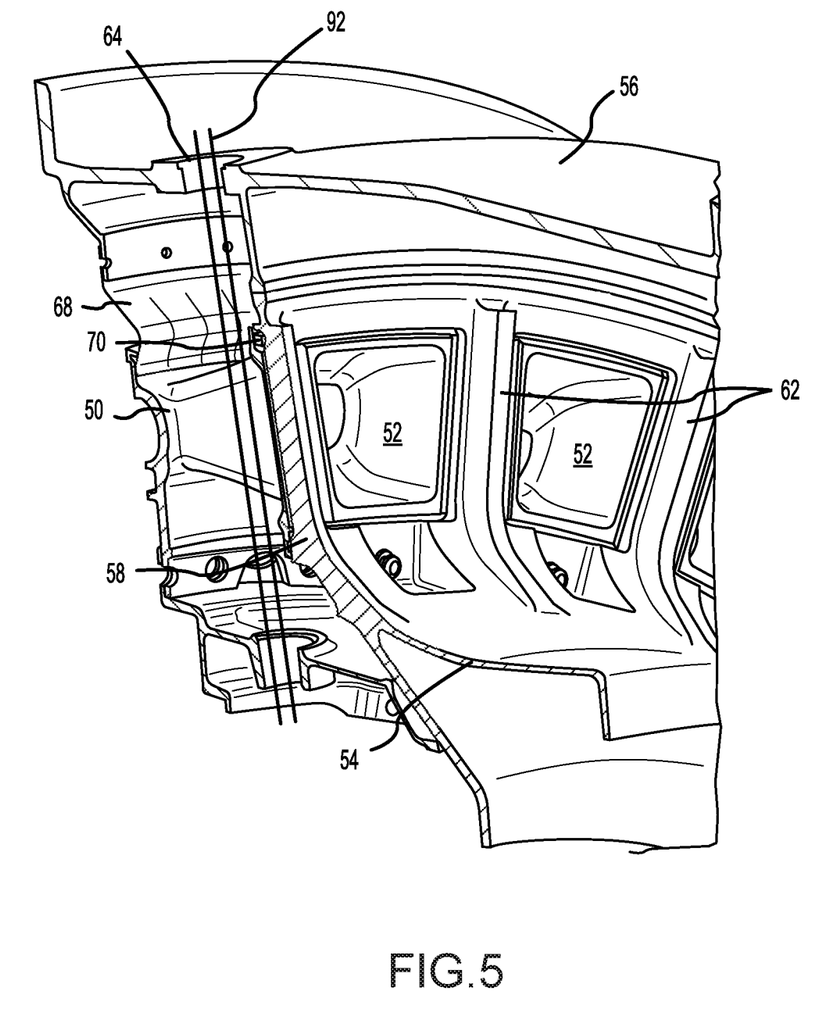
FIG. 5 illustrates a cross-sectional perspective view of a portion of the diffuser case arrangement of FIG. 2.

FIG. 2 illustrates a cross-sectional view of the diffuser case assembly 60 of the gas turbine engine 10 illustrating the high-pressure compressor 40, the combustor 44, and the core flowpath C therebetween. An exit guide vane 46 is positioned within the core flowpath C immediately aft of the high-pressure compressor 40 and alters flow characteristics of core gases exiting the high-pressure compressor 40, prior to the gas flow entering the combustor 44.

With reference to FIGS. 2-5, a fairing 48 is disposed immediately aft of the exit guide vane 46 and forms at least a portion of the core flowpath C (i.e., providing fluid communication) between the high-pressure compressor 40 and the combustor 44. The fairing 48 is disposed circumferentially (e.g., annularly) about the longitudinal axis 24 of FIG. 1. The fairing 48 includes a plurality of passages 52 extending (e.g., generally axially) through the fairing 48 and configured to form the core flowpath C through the fairing 48 between the high-pressure compressor 40 and the combustor 44. The fairing 48 further includes a plurality of recessed portions 50 defined between adjacent passages 52 of the fairing 48. For example, the recessed portions 50 may extend axially from an aft axial end (i.e., an end proximate the combustor 44) of the fairing 48 through a portion of the fairing 48. In various embodiments, each recessed portion of the plurality of recessed portions 50 may be disposed between each respective pair of circumferentially adjacent passages of the plurality of passages 52. In various embodiments, the fairing 48 may be configured as a single piece, for example a single-piece casting or a fully machined component. In various embodiments, the fairing 48 may be configured as a plurality of circumferential segments subsequently assembled (e.g., welded or otherwise attached together) to form the fairing 48.

Annular inner and outer diffuser cases 54, 56 radially house the fairing 48. The outer diffuser case 56 is disposed radially outward of the fairing 48. The inner diffuser case 54 is disposed radially inward of the fairing 48. In various embodiments, the inner and outer diffuser cases 54, 56 may extend generally axially through all or part of the compressor section 14 and/or the combustor section 16. The inner and outer diffuser cases 54, 56 mechanically support structures of the gas turbine engine 10, for example, the inner diffuser case 54 may support a shaft bearing of the gas turbine engine 10.

The inner diffuser case 54 includes a diffuser frame 58 which extends between and couples the inner diffuser case 54 and the outer diffuser case 56. The diffuser frame 58 may extend radially outward and mate with the outer diffuser case 56. Diffuser frame 58 may be coupled to outer diffuser case 56 at an interface 84 via a metal joining process, such as via a weld, solder, or braze. Diffuser frame 58 may be coupled to outer diffuser case 56 at an interface 84 via a mechanical fastener, such as a threaded fastener (e.g., a threaded bolt). In various embodiments, a diffuser frame flange 59 extends radially inward from outer diffuser case 56 to couple to diffuser frame 58. The inner diffuser case 54, outer diffuser case 56, and diffuser frame 58 form a diffuser case assembly 60 (i.e., a "cold structure" in contrast to the "hot" fairing 48). In various embodiments, the diffuser frame 58 and the inner diffuser case 54 may form a single integral component. In various embodiments, the diffuser frame 58 and the inner diffuser case 54 may form a single monolithic component.

The diffuser frame 58 includes a plurality of circumferentially spaced-apart struts 62 with each strut of the plurality of struts 62 configured to radially extend through the fairing 48 between a pair of adjacent passages of the plurality of passages 52. For example, each strut of the plurality of struts 62 may be disposed within a respective recessed portion of the plurality of recessed portions 50. In various embodiments, each pair of adjacent passages of the plurality of passages 52 may correspond to a respective strut of the plurality of struts 62, i.e., a strut of the plurality of struts 62 may radially extend through the fairing 48 between each pair of adjacent passages of the plurality of passages 52. In various embodiments, a quantity of the plurality of struts 62 may be less than a quantity of the plurality of passages 52. For example, each strut of the plurality of struts 62 may radially extend through the fairing 48 between each other pair, each third pair, etc. of adjacent passages of the plurality of passages 52 or any other suitable configuration of the plurality of struts 62 and the plurality of passages 52. This configuration may provide for simpler assembly by allowing the diffuser case assembly 60 to be installed and then allowing the fairing 48 to be installed between the plurality of struts 62 from the forward end (see, e.g., FIG. 3). In various embodiments, the diffuser frame 58 may be physically independent of the fairing 48 (i.e., there is no or minimal physical contact between the diffuser frame 58 and the fairing 48).

In various embodiments, at least one strut of the plurality of struts 62 may be hollow, thereby defining a channel extending radially through at least one the struts. A hollow configuration of the plurality of struts 62 may provide a reduction in the weight of the diffuser case assembly 60. The channel may be configured to conduct a flow of fluid (e.g., cooling air), for example, between a compartment radially outside the inner diffuser case 54 to a compartment radially inside the inner diffuser case 54.

During operational transients of the gas turbine engine 10, the fairing 48 may experience an increased flow of hot gases along the core flowpath C. For example, during a transient acceleration from idle to takeoff power, the increase flow of hot gases through the fairing 48 may cause the fairing 48 to rapidly increase in temperature. Separation of the core flowpath C from the diffuser case assembly 60 (i.e., the "cold structure") by the fairing 48 may prevent the development of large thermal gradients across one or both of the diffuser case assembly 60 and the fairing 48. As a result, the temperature of the fairing 48 may increase while the diffuser case assembly 60 remains at a more uniform, lower temperature compared to the fairing 48. Similarly, the fairing 48 may achieve a more uniform, higher temperature compared to the diffuser case assembly 60. Thus, thermal stress concentrations, for example, between the diffuser frame 58 and the inner diffuser case 54 or across the fairing 48 may be reduced as a result of the minimized thermal gradients.

The fairing 48 may include one or more seals between the fairing 48 and the diffuser case assembly 60. In the illustrated embodiment, the fairing 48 includes a seal 68 (also referred to herein as a first seal) between the fairing 48 and the outer diffuser case 56. Seal 68 may be configured as a finger seal. However, in various embodiments, seal 68 may be configured as other types of seals, such as a piston seal for example. Seal 68 may be configured as an annular ring coupled between fairing 48 and a seal flange 57 extending radially inward from outer diffuser case 56. In various embodiments, seal 68 may be coupled to seal flange 57 via a plurality of rivets, a metal joining process such as a weld, solder, or braze, or any other suitable attachment method. Seal flange 57 may comprise a plurality of circumferentially disposed apertures 91 extending generally axially through seal flange 57 whereby seal 68 is coupled to seal flange 57. In various embodiments, the inner diameter edge of seal 68 may rest against fairing 48 to form a slip joint, thereby maintain the sealing function of the seal 68 in response to radial movement of the fairing 48. The fairing 48 may include a seal 70 (also referred to herein as a second seal) between the fairing 48 and diffuser frame 58. In this regard, seal 70 may be disposed at an aft end of fairing 48. Seal 70 may be configured as a seal having a "W"-shaped cross section, also referred to as a "W" seal. Seal 70 may be configured as an annular ring coupled between fairing 48 and diffuser frame 58. The seals 68, 70 may be configured to maintain the seal between the diffuser case assembly 60 and the fairing 48 as the fairing 48 expands and contracts (e.g., in a radial, axial, etc. direction), independent of the diffuser case assembly 60, as a result of changes in the temperature of the fairing 48. In various embodiments, the number and location of the seals 68, 70 may vary according to diffuser case assembly 60 configuration.

The diffuser case assembly 60 may include at least one sliding joint 72 to provide a support interface between the fairing 48 and the diffuser case assembly 60, while still allowing the fairing 48 to thermally expand and contract. In the illustrated embodiment, the at least one sliding joint 72 includes a fastener 74 extending generally axially between the diffuser frame 58 and the fairing 48 and a bushing 76 surrounding the fastener. In this regard, the sliding joint 72 may be disposed at the aft end of fairing 48. The fastener 74 and bushing 76 may extend through an aperture 78 disposed in fairing 48. Fairing 48 may comprise a flange 77 (also referred to herein as a seal flange) extending radially inward from the aft end of fairing 48. Aperture 78 may be disposed in flange 77. Bushing 76 may comprise a flange 84 at a first end (i.e., the forward end or the left end in FIG. 4B) of the bushing 76 and a shaft 86 at a second end (i.e., the aft end or the right end in FIG. 4B) of the bushing 76. Shaft 86 may extend through aperture 78. Shaft 86 may abut diffuser frame 58. Fastener 74 may abut flange 84. In various embodiments, fastener 74 is configured as a threaded fastener, such as a nut and bolt configuration. The bushing may be compressed between the fastener 74 and the diffuser frame 58. The diffuser frame 58 may be compressed between the fastener 74 and the bushing 76. The diffuser frame 58 and the bushing 76 may both be compressed between opposite ends of fastener 74, The bushing 76 provides a load path between the fastener 74 and the diffuser frame 58 to allow radial movement of the fairing 48 with respect to diffuser frame 58. In this regard, aperture 78 may be oversized to allow movement of fairing 48 in the radial direction. In this manner, sliding joint 72 movably supports the fairing 48 by allowing relative radial movement between the fairing 48 and diffuser frame 58. For example, the fairing 48 may move radially around the bushing 76 in response to at least one of thermal expansion and contraction of the fairing 48 in a radial direction. In various embodiments, fairing 48 may include a groove 80 facing diffuser frame 58. A seal 82 (also referred to herein as a third seal) may be disposed at least partially in the groove 80, Seal 82 may be coupled between diffuser frame 58 and fairing 48 to maintain the seal between the diffuser case assembly 60 and the fairing 48 as the fairing 48 expands and contracts (e.g., in a radial, axial, etc. direction), independent of the diffuser case assembly 60, as a result of changes in the temperature of the fairing 48. Seal 82 may be located radially opposite the fairing 48 from seal 70.

As discussed above, the gas turbine engine 10 throttle transients may cause the fairing 48 to thermally expand or contract while the diffuser case assembly 60 maintains a more consistent and cooler temperature. Accordingly, in various embodiments, the diffuser frame 58 may be made from a first material while the fairing 48 is made from a second material, different than the first material. For example, the fairing 48 may be made from a high-temperature resistant material (e.g., age hardening austenitic nickel-based superalloys, nickel-based alloys, ceramics, ceramic matrix composites, etc.) while the diffuser frame 58 is made from a comparatively stronger material (e.g., austenitic nickel-chromium-based superalloys, titanium, etc.) for improved support and structural stiffness of the diffuser case assembly 60.

In various embodiments, one or more auxiliary lines 92 may extend through one or both of an aperture 64 of the outer diffuser case 56 and through at least one recessed portion of the plurality of recessed portions 50 defined between adjacent passages 52 of the fairing 48. For example, the at least one auxiliary line 92 may be a bearing service line configured to convey oil to or from a bearing of the gas turbine engine 10.

Figure 6:
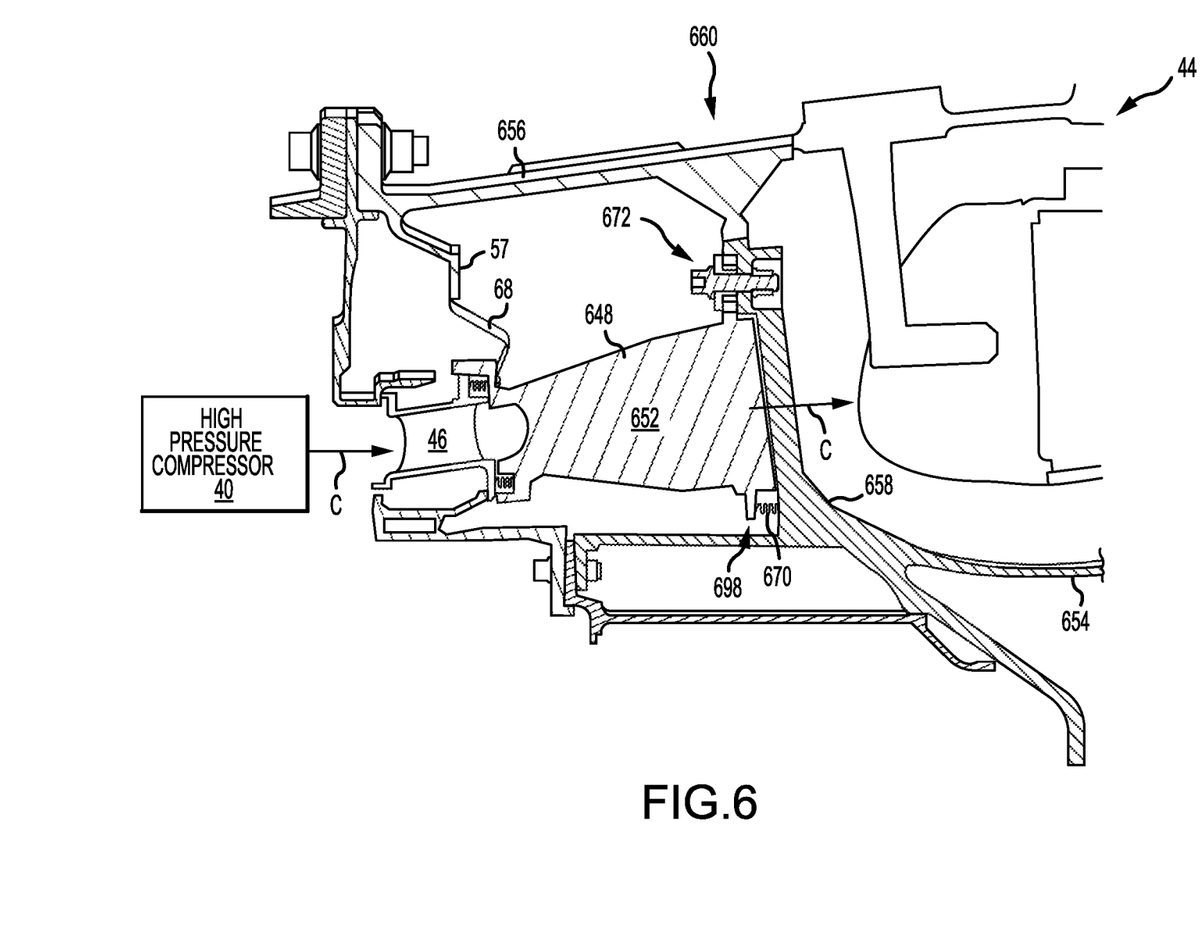
FIG. 6 illustrates a cross-sectional side view of a diffuser case arrangement of a gas turbine engine.

With respect to FIG. 6, elements with like element numbering, as depicted in FIG. 2, are intended to be the same and will not necessarily be repeated for the sake of clarity.

In various embodiments, instead of the sliding joint being located at an inner diameter edge (see FIG. 2) of the fairing, the sliding joint may be located at an outer diameter edge of the fairing. With reference to FIG. 6, an inner diffuser case 654, outer diffuser case 656, and a diffuser frame 658 form a diffuser case assembly 660. The diffuser case assembly 660 may include at least one sliding joint 672 to provide a support interface between the fairing 648 and the diffuser case assembly 660, while still allowing the fairing 648 to thermally expand and contract. The sliding joint 672 may be disposed at a radially outer edge of fairing 648. Sliding joint 672 may be similar to sliding joint 72 of FIG. 2. The fairing 648 may include a seal 670 (also referred to herein as a second seal) between the fairing 648 and diffuser frame 658. Seal 670 may be similar to seal 70 of FIG. 2. Seal 670 may be disposed at an inner diameter edge 698 of fairing 648.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A diffuser case support structure for a gas turbine engine comprising:
 a fairing disposed circumferentially about a longitudinal axis, the fairing defining a plurality of passages circumferentially spaced apart and forming at least a portion of a fluid path between a compressor and a combustor of the gas turbine engine, wherein a front end of the fairing defines the fluid path whereby the fairing is configured to receive a flow of gas and an aft end of the fairing defines the fluid path whereby the flow of gas is configured to exit the fairing at the aft end of the fairing;
 a fairing flange extending from the aft end of the fairing;
 a diffuser frame comprising a plurality of struts, each of the plurality of struts disposed between a pair of adjacent passages of the plurality of passages; and
 a sliding joint forming an interface between the fairing and the diffuser frame, the sliding joint comprising a fastener extending generally axially through an aperture disposed in the fairing flange;
 wherein the diffuser frame is configured to couple an inner diffuser case to an outer diffuser case.

2. The diffuser case support structure of claim 1, wherein a space between each pair of adjacent passages of the plurality of passages defines a recessed portion of the fairing extending axially from an axial end of the fairing through a portion of the fairing.

3. The diffuser case support structure of claim 2, wherein the diffuser frame and the inner diffuser case form a monolithic component.

4. The diffuser case support structure of claim 1, further comprising a first seal configured to maintain a first seal between the outer diffuser case and the fairing.

5. The diffuser case support structure of claim 4, further comprising a second seal configured to maintain a second seal between the fairing and the diffuser frame.

6. The diffuser case support structure of claim 1, wherein the diffuser frame is made of a first material and the fairing is made of a second material different than the first material.

7. The diffuser case support structure of claim 5, further comprising a third seal configured to maintain a third seal between the fairing and the diffuser frame, wherein the second seal is located radially opposite the fairing from the third seal.

8. The diffuser case support structure of claim 1 wherein the sliding joint further comprises a bushing extending through the aperture, the bushing compressed between the diffuser frame and the fastener.

9. The diffuser case support structure of claim 8, wherein the fairing is configured to move radially with respect to the diffuser frame via the sliding joint, in response to at least one of thermal expansion and contraction of the fairing in a radial direction.

10. The diffuser case support structure of claim 9, wherein the bushing comprises a flange at a first end of the bushing and a shaft at a second end of the bushing, wherein the shaft extends through the aperture, the shaft abuts the diffuser frame, and the fastener abuts the flange, and the bushing provides a load path between the fastener and the diffuser frame.

11. The diffuser case support structure of claim 5, wherein at least one strut of the plurality of struts is hollow, thereby defining a channel configured to conduct a flow of fluid between a first compartment radially outside the inner diffuser case to a second compartment radially inside the inner diffuser case.

12. The diffuser case support structure of claim 1, wherein the fairing is a single-piece of material.

13. A diffuser case support structure for a gas turbine engine comprising:
 a fairing disposed circumferentially about a longitudinal axis, the fairing defining:
  a plurality of passages circumferentially spaced apart and forming at least a portion of a fluid path between a compressor and a combustor of the gas turbine engine, wherein a front end of the fairing defines the fluid path whereby the fairing is configured to receive a flow of gas and an aft end of the fairing defines the fluid path whereby the flow of gas is configured to exit the fairing at the aft end of the fairing;
  a space between each pair of adjacent passages of the plurality of passages, the space defining a recessed portion of the fairing extending axially from an axial end of the fairing through a portion of the fairing; and
  a fairing flange extending from the aft end of the fairing;
 a diffuser frame comprising a plurality of struts, each strut of the plurality of struts disposed between a pair of adjacent passages of the plurality of passages; and
 a sliding joint forming an interface between the fairing and the diffuser frame, the sliding joint comprising a fastener extending generally axially through an aperture disposed in the fairing flange;
 wherein the diffuser frame is configured to couple an inner diffuser case to an outer diffuser case.

14. The diffuser case support structure of claim 13, wherein the diffuser frame and the inner diffuser case form a monolithic component.

15. The diffuser case support structure of claim 13, further comprising a diffuser frame flange extending radially inward from the outer diffuser case, wherein the diffuser frame is configured to be coupled to the diffuser frame flange via at least one of a metal joining process or a mechanical fastener.

16. The diffuser case support structure of claim 13, further comprising:
 a seal flange extending radially inward from the outer diffuser case; and
 a first seal configured to maintain a seal between the seal flange and the fairing.

17. A gas turbine engine comprising:
 an inner diffuser case;
 an outer diffuser case; and
 a diffuser case support structure coupling the inner diffuser case to the outer diffuser case, the diffuser case support structure comprising:
 a fairing disposed circumferentially about a longitudinal axis, the fairing defining a plurality of passages circumferentially spaced apart and forming at least a portion of a fluid path between a compressor and a combustor of the gas turbine engine, wherein a front end of the fairing the fluid path whereby the fairing is configured to receive a flow of gas and an aft end of the fairing defines the fluid path whereby the flow of gas is configured to exit the fairing at the aft end of the fairing;

a fairing flange extending from the aft end of the fairing;

a diffuser frame comprising a plurality of struts, each of the plurality of struts disposed between a pair of adjacent passages of the plurality of passages; and a sliding joint forming an interface between the fairing and the diffuser frame, the sliding joint comprising a fastener extending generally axially through an aperture disposed in the fairing flange.

18. The gas turbine engine of claim 17, wherein the diffuser frame and the inner diffuser case form a monolithic component.

19. The gas turbine engine of claim 17, wherein the diffuser frame is coupled to the outer diffuser case via at least one of a metal joining process or a mechanical fastener.

20. The gas turbine engine of claim 17, wherein the diffuser frame is made of a first material and the fairing is made of a second material different than the first material.

* * * * *